US012072806B2

(12) United States Patent
Wang et al.

(10) Patent No.: US 12,072,806 B2
(45) Date of Patent: Aug. 27, 2024

(54) COMPRESSION AND DECOMPRESSION MODULE IN A CACHE CONTROLLER FOR REDUCING OFF-CHIP DATA TRAFFIC

(71) Applicant: Alibaba Group Holding Limited, Grand Cayman (KY)

(72) Inventors: Xiaowei Wang, Hangzhou (CN); Li Zhao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 241 days.

(21) Appl. No.: 16/749,426

(22) Filed: Jan. 22, 2020

(65) Prior Publication Data

US 2021/0224191 A1   Jul. 22, 2021

(51) Int. Cl.
*G06F 12/0842* (2016.01)
*G06N 20/00* (2019.01)

(52) U.S. Cl.
CPC ......... *G06F 12/0842* (2013.01); *G06N 20/00* (2019.01); *G06F 2212/401* (2013.01); *G06F 2212/452* (2013.01)

(58) Field of Classification Search
CPC ........... G06F 12/0842; G06F 2212/401; G06F 2212/452; G06F 12/0813; G06F 3/0608; G06F 3/0665; G06F 3/067; G06F 12/1072; G06F 2212/1041; G06F 2212/1016; G06F 2212/154; G06F 2212/163; G06N 20/00
USPC ....................................................... 711/125
See application file for complete search history.

(56) References Cited

U.S. PATENT DOCUMENTS

| | | |
|---|---|---|
| 6,748,501 B2 | 6/2004 | Arimilli et al. |
| 7,082,419 B1 | 7/2006 | Lightowler |
| 8,001,330 B2 | 8/2011 | Clark et al. |
| 8,621,184 B1 | 12/2013 | Radhakrishnan et al. |
| 8,631,207 B2 | 1/2014 | Fang et al. |
| 9,170,812 B2 | 10/2015 | Vorbach et al. |
| 9,875,440 B1 | 1/2018 | Commons |
| 10,048,826 B2 | 8/2018 | Leeman-Munk et al. |
| 10,223,635 B2 | 3/2019 | Annapureddy et al. |
| 10,403,003 B2 | 9/2019 | Appu et al. |
| 10,411,727 B1 | 9/2019 | Lan et al. |
| 10,592,452 B1 | 3/2020 | Barner |

(Continued)

FOREIGN PATENT DOCUMENTS

| | | |
|---|---|---|
| CN | 109993684 A | 7/2019 |
| DE | 102018129135 A1 | 5/2019 |

(Continued)

*Primary Examiner* — Gautam Sain
*Assistant Examiner* — Wei Ma

(57) ABSTRACT

A method for performing data compression in a multi-core processor comprises retrieving a chunk of data from a data array of a cache slice, wherein the cache slice is comprised within a cache associated with the multi-core processor, wherein the cache is distributed between a plurality of cache slices, and wherein each core of the multi-core processor can access each of the plurality of cache slices. The method further comprises calculating a bit mask for the chunk of data and, using the bit mask, shifting out elements in the chunk of data corresponding to zero values, wherein zero value elements in the chunk of data are shifted out and non-zero value elements in the chunk of data are retained. Finally, the method comprises writing the bit mask and the non-zero value elements to a memory.

13 Claims, 6 Drawing Sheets

System overview for data compression

(56) References Cited

U.S. PATENT DOCUMENTS

| | | |
|---|---|---|
| 10,705,960 B2 | 7/2020 | Hum et al. |
| 10,725,919 B2 | 7/2020 | Hum et al. |
| 10,725,934 B2 | 7/2020 | Henry et al. |
| 10,733,350 B1 | 8/2020 | Prasad et al. |
| 10,917,800 B2 | 2/2021 | Rahman et al. |
| 2007/0016724 A1* | 1/2007 | Gaither ............ G06F 12/023 711/E12.006 |
| 2015/0106596 A1 | 4/2015 | Vorbach et al. |
| 2016/0170878 A1* | 6/2016 | Trika ............ G06F 12/0871 711/118 |
| 2016/0358069 A1 | 12/2016 | Brothers et al. |
| 2018/0267898 A1 | 9/2018 | Henry et al. |
| 2018/0300246 A1* | 10/2018 | Sakthivel ......... G06F 12/0837 |
| 2018/0300606 A1* | 10/2018 | Corkery ............ G06F 12/10 |
| 2019/0026228 A1 | 1/2019 | Jiang |
| 2019/0066257 A1 | 2/2019 | Daga et al. |
| 2019/0081637 A1* | 3/2019 | Pool ............. G06F 12/0866 |
| 2019/0130272 A1 | 5/2019 | Yosinski et al. |
| 2019/0190538 A1 | 6/2019 | Park et al. |
| 2019/0206091 A1 | 7/2019 | Weng |
| 2019/0228284 A1 | 7/2019 | Holland |
| 2019/0243780 A1 | 8/2019 | Gopal et al. |
| 2019/0279095 A1 | 9/2019 | Guntoro et al. |
| 2019/0286980 A1 | 9/2019 | Backhus et al. |
| 2019/0394655 A1 | 12/2019 | Rahman et al. |
| 2020/0081857 A1 | 3/2020 | Barner |
| 2020/0143226 A1* | 5/2020 | Georgiadis .......... G06N 3/0481 |
| 2020/0342632 A1* | 10/2020 | Frumkin ............ G06T 9/002 |
| 2021/0011846 A1* | 1/2021 | Venkatesh ............ G06N 3/063 |
| 2021/0216464 A1* | 7/2021 | Uhrenholt .......... G06F 12/0891 |

FOREIGN PATENT DOCUMENTS

| | | |
|---|---|---|
| EP | 3346423 A1 | 7/2018 |
| EP | 3401840 A1 | 11/2018 |
| EP | 3506108 A1 | 7/2019 |
| WO | 2018058426 A1 | 4/2018 |
| WO | 2018121670 A1 | 7/2018 |
| WO | 2019009490 A1 | 1/2019 |
| WO | 2019143026 A1 | 7/2019 |

* cited by examiner

System overview for data compression

COMPRESSION AND DECOMPRESSION MODULE IN A CACHE CONTROLLER FOR REDUCING OFF-CHIP DATA TRAFFIC

FIELD OF THE INVENTION

Embodiments according to the present disclosure relate to data compression techniques to reduce data movement between a main memory and a cache memory of a central processing unit (CPU).

BACKGROUND OF THE INVENTION

In recent years, there has been increasing interest in using machine learning methods in connection with a wide variety of applications. Machine learning is the umbrella term for computational techniques that allow models to learn from data rather than following strict programming rules. Machine learning algorithms build a mathematical model based on sample data, known as "training data," in order to make predictions or decisions without being explicitly programmed to perform the task. Machine learning includes using several different types of models including artificial neural networks (ANNs), deep learning methods, etc.

Artificial neural networks (ANN) are computing systems that are inspired by, but not identical to, biological neural networks that constitute animal brains. Such systems "learn" to perform tasks by considering examples, generally without being programmed with task-specific rules. Other types of neural networks include recurrent neural networks (RNN), convolutional neural networks (CNNs), deep belief networks, etc. Some neural networks comprise multiple layers that enable hierarchical feature learning.

Deep learning (also known as deep structured learning or hierarchical learning) is part of the broader family of machine learning methods based on ANNs. Deep learning describes learning that includes learning hierarchical features from raw input data and leveraging such learned features to make predictions associated with the raw input data.

Before neural network models can be used, they need to be trained. Training refers to the process of a creating a machine learning algorithm. Training involves the use of a deep-learning framework and training dataset. Inference refers to the process of using a trained machine learning algorithm to make a prediction. Stated differently, training refers to learning a new capability from existing data, and inference refers to applying the new capability to new data.

Training and inference for neural network models requires processing a significant amount of data. The data is usually stored in main memory but processed in the CPU and, therefore, needs to be read from and written to the main memory. Consequently, the memory bandwidth is typically saturated with a large number of data requests and, thus, becomes the bottleneck for the applications.

Neural network models use activation functions to decide whether a neuron should be activated or not by calculating a weighted sum and further by adding bias to it. The purpose of the activation function is to introduce non-linearity into the output of a neuron. An activation layer is an activation function that decides the final value of a neuron. Activation maps are a visual representation of activation values at various layers of the neural network. Activation maps comprise intermediate results computed by each stage of a neural network model, and are used by the next stage of the model.

A neural network model may comprise multiple stages, so a training or inference process may, for example, produce multiple activation maps.

Certain conventional Artificial Intelligence (AI) systems repurpose the last level cache of a CPU as in-place computing units by adding a small amount of peripheral logic. When functioning in computing mode, the CPU cache is treated as a scratchpad with direct addressing. To implement training of neural network models (e.g., ANNs, CNNs etc.) with the in-cache computing architecture, the activation map data computed in the CPU needs to be stored to main memory and loaded back to the CPU at a later time, as the on-chip cache does not have enough capacity to hold the data. Further, another challenge encountered as a result of storing the activation map in memory and loading it back into the CPU is that the data transfer rate and amount are bounded by the memory bandwidth.

Data compression is a technique that reduces the total data footprint by leveraging the similarities within the data, and encoding the data in a more compact way for communication and storage. In many AI applications, the required data can be compressed into a much smaller size, which takes less time to transfer between the CPU and memory. However, the compressed data needs to be decompressed before it can be processed by the application. Implementing the compression and decompression process consumes a significant amount of processing time. Therefore, the benefit of data compression is offset by the extra compression and decompression time.

BRIEF SUMMARY OF THE INVENTION

Accordingly, a need exists for a compression and decompression methodology that can address the problems with the systems described above. Using the beneficial aspects of the systems described, without their respective limitations, embodiments of the present disclosure provide novel solutions to address these problems.

To implement training of neural network models (e.g., ANNs, CNNs etc.), activation map data computed in CPU typically needs to be stored to main memory and loaded back to CPU at a later time because the on-chip cache does not have enough capacity to hold the data. One of the challenges encountered as a result of needing to store the activation map in memory and load it back into the CPU is that the data transfer is bounded by the memory bandwidth.

Embodiments of the present disclosure provide hardware compression and decompression modules that can be deployed within CPU cache controllers to reduce data movement with main memory for reducing the required time for neural network (e.g., CNN) training or inference.

In order to compress the activation maps before transferring them to the main memory, embodiment of the present disclosure use zero-value compression, which comprises removal of redundant zeroes from a number. Zero suppression is especially useful for compressing activation maps, which often contain a large number of zeros particularly where the associated activation function is a Rectified Linear Unit (or ReLU function).

Using zero-value compression, embodiments of the present disclosure compress chunks of data associated with activation maps, where the compressed data comprises a bit mask and the non-zero values. Each bit of the bit mask corresponds to one element (e.g. a byte) in the uncompressed data, and indicates whether the value of the data is zero. Accordingly, the bit-mask comprises a compact way of conveying the locations of all the zero elements in a chunk of uncompressed data. The non-zero values are stored in the same order as in the uncompressed data (but without the '0's in the original chunk of data). By using a bit mask and storing the non-zero values in a chunk of data separately, embodiments of the present disclosure are advantageously able to compress feature maps significantly prior to transferring them to the main memory.

In one embodiment, a method for performing data compression in a multi-core processor is disclosed. The method comprises retrieving a chunk of data from a data array of a cache slice, wherein the cache slice is comprised within a cache associated with the multi-core processor, wherein the cache is distributed between a plurality of cache slices, and wherein each core of the multi-core processor can access each of the plurality of cache slices. The method further comprises calculating a bit mask for the chunk of data and, using the bit mask, shifting out elements in the chunk of data corresponding to zero values, wherein zero value elements in the chunk of data are shifted out and non-zero value elements in the chunk of data are retained. Finally, the method comprises writing the bit mask and the non-zero value elements to a memory.

In another embodiment, a system for performing data decompression in a cache controller of a multi-core processor is disclosed. The system comprises a processor comprising a plurality of processor cores and a cache associated with the processor, wherein the cache is distributed between a plurality of cache slices, wherein each processor core can access each of the plurality of cache slices. Each cache slice comprises a data array operable to store decompressed data and a data decompression module configured to: (a) retrieve a bit mask corresponding to a compressed chunk of data from a memory associated with the processor: (b) retrieve non-zero value elements corresponding to the compressed chunk of data from the memory: (c) using the bit mask, decompress the compressed chunk of data by shifting the non-zero value elements to insert zero value elements at locations indicated by the bit mask: and (d) write the decompressed chunk of data to the data array.

The following detailed description together with the accompanying drawings will provide a better understanding of the nature and advantages of the present disclosure.

BRIEF DESCRIPTION OF THE DRAWINGS

Embodiments of the present disclosure are illustrated by way of example, and not by way of limitation, in the figures of the accompanying drawings and in which like reference numerals refer to similar elements.

Figure 1:
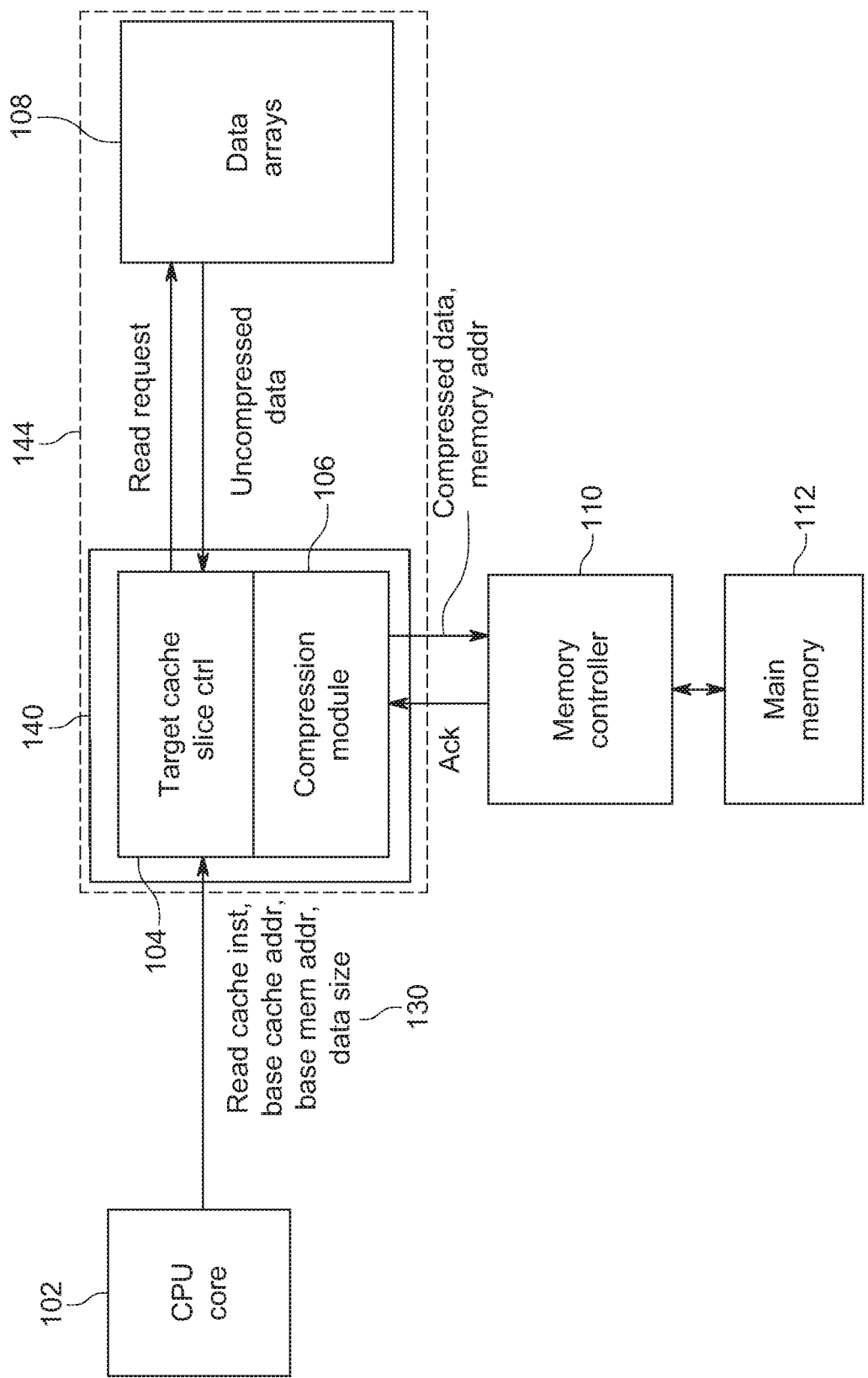
FIG. 1 is a block diagram illustrating the manner in which data can be compressed using a hardware-implemented compression/de-compression module integrated within a cache controller in accordance with an embodiment of the present disclosure.

In the figures, elements having the same designation have the same or similar function.

DETAILED DESCRIPTION OF THE INVENTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Notation and Nomenclature Section

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing the terms such as "reading," "inserting," "writing," "transferring," "accessing," "padding," "shifting," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description below provides a discussion of computers and other devices that may include one or more modules. As used herein, the term "module" or "block" may be understood to refer to software, firmware, hardware, and/or various combinations thereof. It is noted that the blocks and modules are exemplary. The blocks or modules may be combined, integrated, separated, and/or duplicated to support various applications. Also, a function described herein as being performed at a particular module or block may be performed at one or more other modules or blocks and/or by one or more other devices instead of or in addition to the function performed at the described particular module or block. Further, the modules or blocks may be implemented across multiple devices and/or other components local or remote to one another. Additionally, the modules or blocks may be moved from one device and added to another device, and/or may be included in both devices. Any software implementations of the present disclosure may be tangibly embodied in one or more storage media, such as, for example, a memory device, a floppy disk, a compact disk (CD), a digital versatile disk (DVD), or other devices that may store computer code.

The terminology used herein is for the purpose of describing particular embodiments only and is not intended to limit the scope of the present disclosure. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

A Compression and Decompression Module in a Cache Controller for Reducing Off-Chip Data Traffic As noted above, activation maps are visual representations of activation values at various layers of the neural network. Activation maps comprise intermediate results computed by each stage of a neural network model, and are used by the next stage of the model. A neural network model may comprise multiple stages, therefore a training or inference process may, for example, produce multiple activation maps.

To implement training of neural network models (e.g., ANNs, CNNs etc.), activation map data computed in the CPU typically needs to be stored to main memory and loaded back to the CPU at a later time because the on-chip cache does not generally have enough capacity to hold the data. One of the challenges encountered as a result storing the activation map in memory and loading it back into the CPU is that the data transfer is bounded by the memory bandwidth.

Embodiments of the present disclosure provide hardware compression and decompression modules that can be deployed within CPU cache controllers to reduce data movement with main memory for reducing the time for neural network (e.g., CNN) training or inference processing.

Compression

FIG. 1 is a block diagram illustrating the manner in which data can be compressed using a hardware-implemented compression/decompression module integrated within a cache controller in accordance with an embodiment of the present disclosure.

In a multicore processor, each core (e.g., CPU core 102) may be connected with and may access a cache slice, e.g., cache slice 144. A last-level cache in a multi-core processor will typically be shared by all the cores. The cache will usually be distributed across several cache slices (instead of being a monolithic cache). Each core in the multi-core processor may access any of the cache slices. The determination regarding which cache slice is accessed by a core is based on the address. Each cache slice, for example, may correspond to a particular address space. Based on a read or write address for an instruction then, a core will access a cache slice associated with the given address.

Each cache slice, e.g., cache slice 144 comprises a cache controller, e.g., cache controller 140, and a corresponding data array, e.g., data array 108. In one embodiment of the present disclosure, the cache controller (e.g. controller 140) comprises a cache slice control module (e.g., module 104) and a compression/decompression module (e.g. module 106).

The cache slices in a cache communicate with each other in a mesh interconnect (also known as Network on Chip (NOC)). In each cache slice, the cache controller (e.g., cache controller 140) is coupled with a compression/decompression module (e.g., compression/decompression module 106). The compression/decompression module 106 is responsible for compressing the data received from a CPU core into a corresponding cache slice 144 (for transferring to main memory), as well as decompressing the data that is received from the main memory 112 using the memory controller 110 into the corresponding cache slice 144. Therefore, the data transferred from the cache slice 144 to memory 112 is in a compressed format with a smaller size, thereby, reducing the total time spent in data transfer.

As noted above, to implement training and inference of neural network models (e.g., ANNs, CNNs etc.), activation map data computed in the CPU typically needs to be stored to main memory and loaded back to the CPU at a later time because the on-chip cache does not have enough capacity to hold the data.

When a CPU core 102, for example, needs to compress and transfer an activation map to the memory, a read cache instruction 130 (accompanied with the base cache address, the base memory address and the data size of the unit of data to be read) is initiated. The read request is transmitted to a data array 108 of the cache slice associated with the cache address. In response to the read instruction, uncompressed data is read from the data array 108 and is compressed by the compression module 106 prior to transmitting to the memory 112 (using memory controller 110). Note that both the compressed data and the associated memory address for the main memory are transmitted by the cache controller 140 to the main memory 112 using memory controller 110.

In one embodiment, a data transfer takes place from the CPU core 102 (and a given associated cache slice 144) to the main memory 112 after each convolution operation in a neural network, wherein output feature maps (also known as activation maps) are transferred from the cache to store in main memory. The maps being transferred to the main memory need to be compressed by compression/decompression module 106 prior to the transfer. Furthermore, a data transfer takes place from the memory 112 to the cache slice 144 before each convolution operation, wherein input feature maps are loaded from the memory to the cache. It is appreciated that the maps being transferred from the main memory to the cache need to be decompressed using compression/decompression module 106 prior to the transfer.

Figure 2:
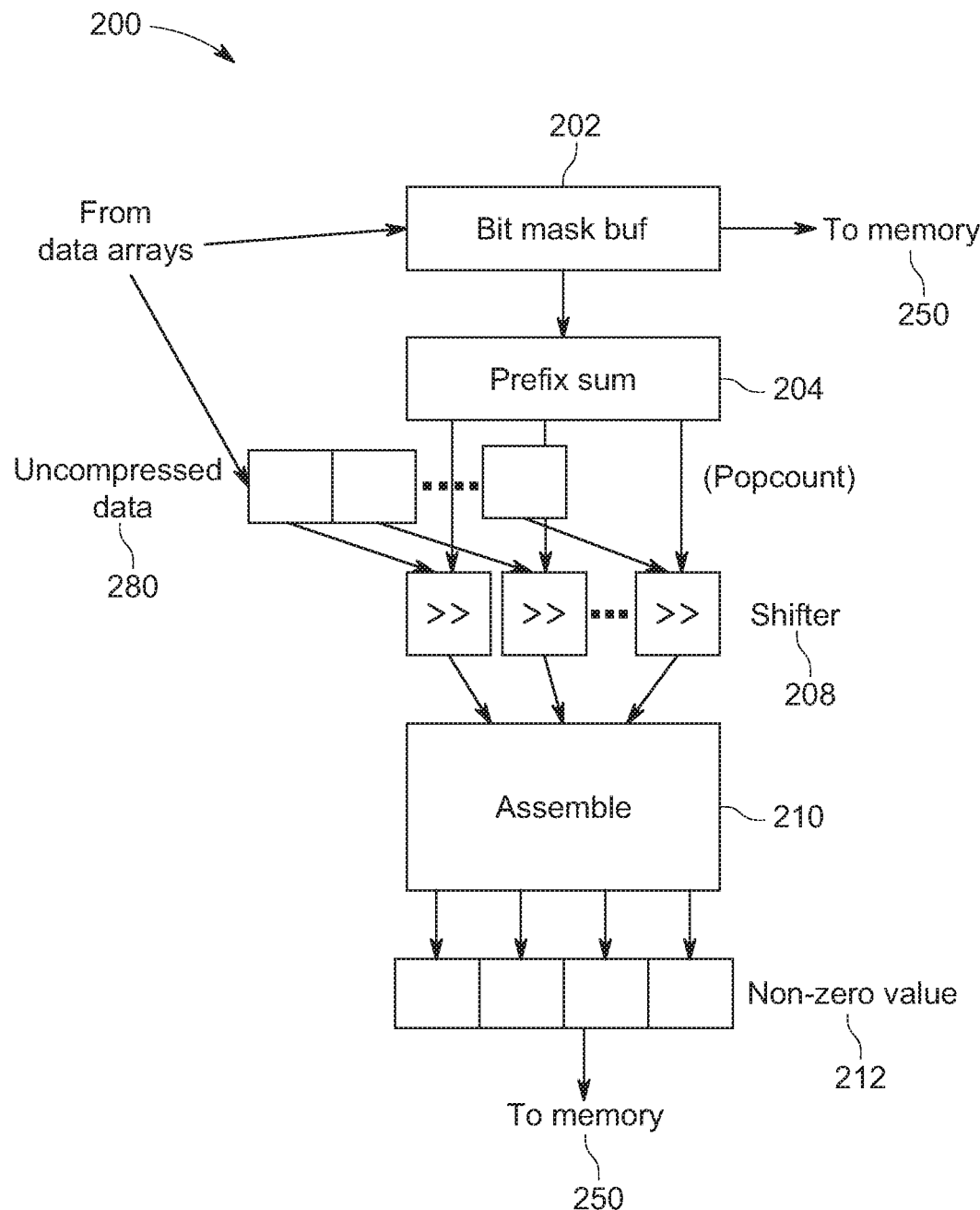
FIG. 2 is a block diagram illustrating the architecture of the compression module in accordance with an embodiment of the present disclosure.

FIG. 2 is a block diagram illustrating the architecture of the compression module 200 in accordance with an embodiment of the present disclosure.

In one embodiment, the compression module 200 (which is equivalent to compression module 106 in FIG. 1) implements zero-value compression (also known as 'zero suppression'), which comprises removal of redundant zeroes from a number. Zero suppression is especially useful for compressing activation maps, which often contain a large number of zeros particularly where the associated activation function is a Rectified Linear Unit (or ReLU function). The ReLU function is used in most convolutional neural networks or deep learning models. The ReLU function f(z) is half rectified and outputs a zero when z is less than zero and outputs a value of z when z is above or equal to zero.

Accordingly, activation maps using the ReLU function may contain a large number of zeroes.

In zero-value compression, the compressed data comprises a bit mask and the non-zero values. In the bit mask, each bit corresponds to one element in the uncompressed data, and it indicates whether the value of the data is zero. The non-zero values are stored in the same order as in the uncompressed data.

For example, if zero-value compression is implemented for an exemplary byte stream "0x00700400" (where each number is a byte comprising 8 bits), the compressed data will comprise a bit-mask and the non-zero values. The bit-mask indicates the positions of all the zero values in the byte stream. For example, an 8-bit bit-mask may be generated for the byte stream where a '1' for each bit in the bit-mask indicates whether a corresponding byte in the byte stream is a 0. Accordingly, the bit-mask generated for the exemplary byte stream "0x00700400" may be "11011011" where a "1" indicates if a corresponding byte in the byte stream is a 0 and a "0" indicates if the corresponding byte in the byte stream comprises a non-zero value. Further, for bytes in the byte stream that are non-zero (e.g., the values of 7 and 4 in the above byte stream), the non-zero values will also need to be stored in order to capture all the values in the byte stream. In this way, 8 bytes of data in the byte stream can be compressed down, for example, to an 8-bit (1 byte) bit-mask and the additional non-zero values (e.g., the values of 7 and 4 in the above bye stream) within the byte stream.

In one embodiment, the unit of uncompressed data in one data transfer transaction handled by a single cache slice is called a "bulk." The size of a bulk is controlled by software (and varies for different layers of the neural network), and is known to the compression module (e.g. module 106) at the time of compression. The size of a bulk depends on the model dimension of the layer (of the neural network), as well as the data mapping for the layer. In one embodiment, each bulk comprises 20 kB to 160 KB of data. However, the range is exemplary only and, in different embodiments, the bulk size may vary and embodiments of the present disclosure are not restricted to any particular bulk size.

Note that in main memory 112, each bulk of data still takes up the same address space as the uncompressed case because the compressed data size for a bulk is unknown before compression, so memory space is allocated conservatively in order to accommodate the worst case situation (with all non-zero values). The starting address in the memory of a bulk is also managed by software, such that the address spaces for different bulks do not conflict.

In one embodiment, a bulk of uncompressed data is first transferred from a CPU core to the data arrays (e.g., arrays 108) of a corresponding cache slice (selected based on the associated address space for the cache slice). Note that each bulk is further partitioned into chunks. After transferring a bulk of data from the CPU core to data arrays of a cache slice, the data can be read from the data arrays and compressed using compression module 106 in units of "chunks" prior to transferring the data to the main memory 112.

A chunk is a basic unit for the module 106 to execute compression/decompression. Stated differently, the compression/decompression module 106 compresses and decompresses data in fixed size units of 'chunks.' Each chunk contains a fixed size (chunk length) of uncompressed elements. Therefore, the number of chunks in a bulk is independent of the compression rate, and can be determined by the software. In one embodiment, the chunk length is selected such that the memory bandwidth is efficiently utilized. In an embodiment, a chunk may be 512 bytes long but this length is exemplary. Note that in different embodiments, the chunk size may vary and embodiments of the present disclosure are not restricted to any particular chunk size.

For example, if a bulk comprises 1 KB of data, the bulk would need to be split into 2 fixed size chunks of 512 bytes for module 106 to perform compression on the data. Further, if a cache line size of the target architecture is 64 bytes and the chunk length is 512 bytes, the corresponding bit mask of one chunk can be loaded/stored as one cache line (512 bytes/8=64 bytes, where 1 byte of chunk data compresses into one corresponding bit in the bit-mask). In other words, using the compression scheme in accordance with embodiments of the present disclosure, the 512 bytes in a chunk can be advantageously compressed down to a bit mask comprising a single cache line (not including the non-zero elements).

As mentioned above, in one embodiment, the chunk length is selected such that the memory bandwidth is efficiently utilized. For example, a chunk length of 512 bytes may be selected specifically because it results in a bit-mask that is equivalent to a single cache line.

Referring to FIG. 1 then, the core 102 first initializes the data transfer by issuing the specialized instruction for compression (details of modifications to the instruction set architecture of the processor to accommodate specialized instructions associated with the compression/decompression module 106 will be discussed below). The instruction is transferred to the associated cache slice controller (e.g. 104) depending on the source address specified in the instruction.

The cache slice controller 104 accesses data in units of chunks from the data arrays 108, and the compression module 106 compresses the data one chunk at a time. The number of cycles it takes for module 106 to compress a chunk of data depends on the hardware implementation. The cache controller 104 starts requesting data from the cache addresses (e.g., in scratchpad mode) following the instruction it has received. In compression, the data is processed with one chunk as the basic unit, meaning the data within a chunk are compressed together. Accordingly, the cache slice controller 104 collects data from the data arrays 108 until one chunk of data is fetched.

Subsequently, all the data within the chunk are compared with zero, to generate the bit mask for the chunk. Referring to FIG. 2, once the compression module 106 receives the chunk of data to be compressed, it first generates and stores a bit mask for the chunk of data into a bit mask buffer 202. Note that in the in-cache bit-serial computing, the data is laid out in transposed format, and accordingly, the bit mask can be generated by sensing the NOR of all the bits of data in parallel for all the bit-line units. The bit mask is placed at the beginning of the compressed data (before transferring to main memory 250). It should be noted that bit-masks can either use a "1" or a "0" value to indicate the zero values in a data chunk provided a consistent methodology is used to distinguish between zero and non-zero values within the data chunk. As discussed above, however, in addition to the bit-mask, the non-zero values within a respective chunk of data also need to be transferred to the main memory 250.

A prefix-sum circuit 204 takes the bit mask as the input and the result is used as shift offsets where the uncompressed data 280 is shifted using a shifter 208, assembled using an assemble module 210, and copied to the output buffer 212 inside the compression module 106 module. In other words, using the bit-mask as input, the prefix-sum circuit 204 is able to determine the locations of the non-zero values in the associated chunk (the uncompressed data 280). The bit-mask is used to pop out all the bytes corresponding to zeros in the associated chunk of data while the non-zero values are collected using the shifter 208 and assembler module 210. For example, if a bit-mask has two consecutive '1's (indicating zero values in the corresponding uncompressed data) followed by a '0', the pre-fix sum circuit 204 can skip 2 bytes (or 16 bits) of data in the associated chunk to be able to retrieve the non-zero value of interest to transfer to the compressed format.

The output buffer 212 is organized into entries equal to the size of a cache line (e.g., 32 entries for bfloat16 data) in one embodiment. When one cache line of data is filled, the cache controller initiates one write operation to the main memory. For example, if a chunk has 64 non-zero values, it would take only a single write operation to the main memory to transfer the non-zero values (because 64 bytes equal a single cache line). Note that the uncompressed data (e.g. the non-zero values) may be written to the main memory using a separate write operation than the bit-mask.

By using a bit mask and storing the non-zero values in a chunk of data separately, embodiments of the present disclosure are advantageously able to compress feature maps significantly prior to transferring them to the main memory.

A counter (not shown in FIG. 2) is deployed to calculate the offset to the starting address and thus the exact address in memory. For the output buffer 212 of the final non-zero values, zeros are padded until a complete cache line is filled. For example, if a chunk has 127 non-zero values, it would fill up two cache lines with one empty slot. The empty slot would be padded with a zero to fill up the second cache line. Subsequently, two separate write operations would be required to transfer the two cache lines to the main memory.

Note that the pages in main memory 250 containing the memory space corresponding to the compressed data are pinned so that they will not be evicted before they are used again. In one embodiment, the write operation to main memory 250 will be handled by the memory controller (e.g. memory controller 110) on chip.

Figure 5:
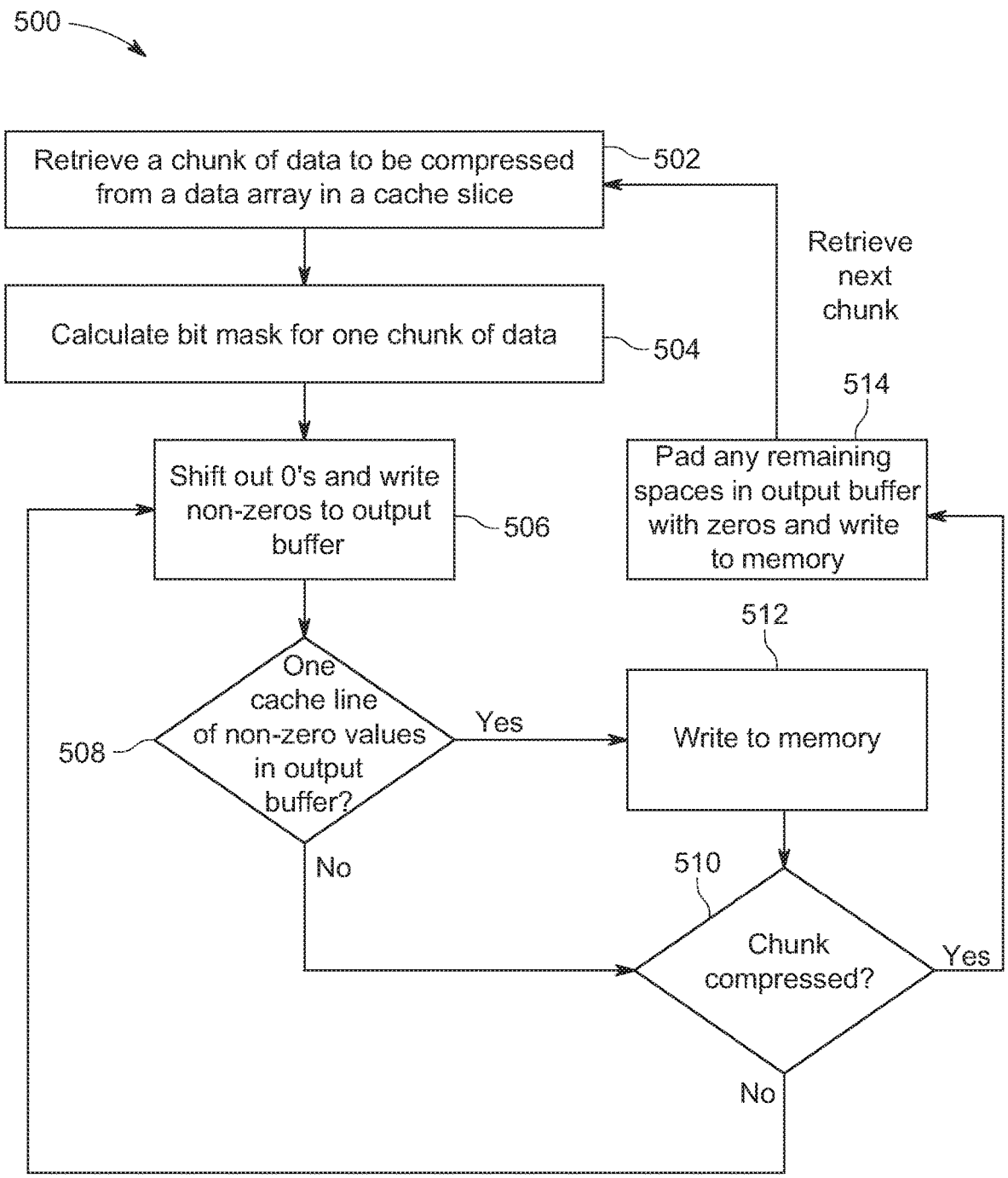
FIG. 5 depicts a flowchart illustrating an exemplary computer-implemented process for compressing data in a cache slice of a multi-core processor prior to transferring the data to main memory in accordance with an embodiment of the present disclosure.

FIG. 5 depicts a flowchart illustrating an exemplary computer-implemented process 500 for compressing data in a cache slice of a multi-core processor prior to transferring the data to main memory in accordance with an embodiment of the present disclosure.

At step 502, a chunk of data to be compressed is retrieved from a data array (e.g. data array 108) of a cache slice. The chunk of data may, for example, be retrieved using a cache control module 140, which comprises a compression module 106. As noted above, the retrieval may be performed in response to a specialized compression instruction issuing from the processor. In one embodiment, the compression module implements zero-value compression.

At step 504, a bit mask is determined for the retrieved chunk of data.

At step 506, using the bit mask, the '0' values in the chunk of data are shifted out, while the non-zero values are written to an output buffer (e.g. buffer 212) within the compression module. As noted above, a prefix-sum circuit, e.g., 204 takes the bit mask as an input and the result is used as shift offsets where the uncompressed data 280 is shifted using a shifter 208, assembled using an assemble module 210, and copied to the output buffer 212 inside the compression module 106 module.

At step 508, a determination is made regarding whether the output buffer has been filled with a single cache line worth of non-zero values. Responsive to a determination that the output buffer comprises a cache line of non-zero values, a write request is made to the memory at step 512, wherein the non-zero values are written to the main memory at an address specified in the compression instruction issued by the processor.

Responsive to a determination that the output buffer is not full, at step 510, a determination is made regarding whether the retrieved chunk of data has been compressed. In response to a determination that the chunk has not yet been compressed, the process is repeated starting at step 506.

Responsive to a determination that the chunk has been fully compressed, at step 514, any remaining unfilled values in the output buffer are padded with '0's and the next chunk of data is retrieved into the compression module at step 502.

Decompression

Figure 3:
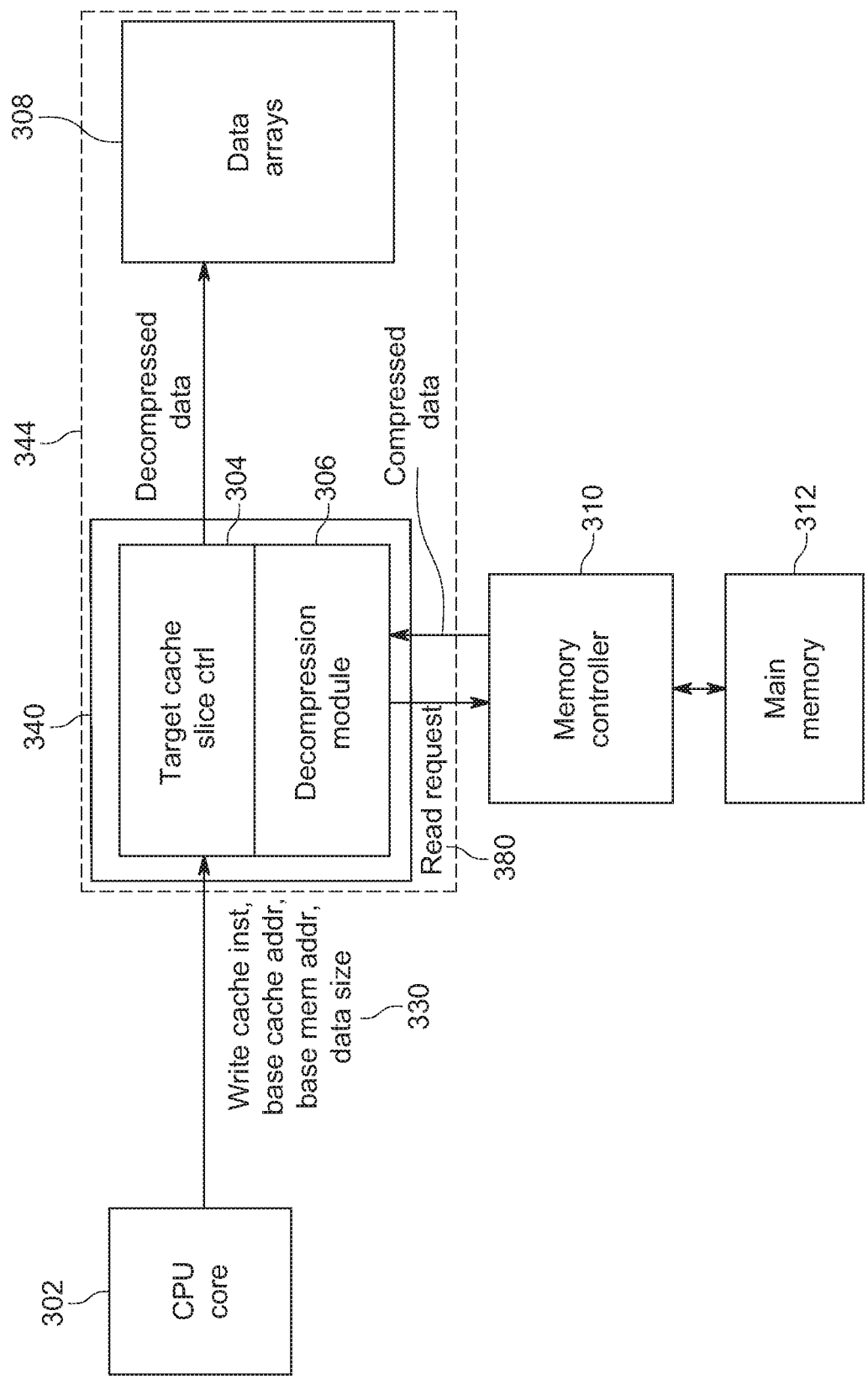
FIG. 3 is a block diagram illustrating the manner in which data can be decompressed using a hardware-implemented compression/de-compression module integrated within a cache controller in accordance with an embodiment of the present disclosure.

FIG. 3 is a block diagram illustrating the manner in which data can be decompressed using a hardware-implemented compression/de-compression module integrated within a cache controller prior to transferring it from the main memory to a CPU cache in accordance with an embodiment of the present disclosure.

As noted above, in a multicore processor, each core (e.g., CPU core 302) may be connected with and may access a cache slice, e.g., cache slice 444. Each cache slice, e.g., cache slice 344 comprises a cache controller, e.g., cache controller 340 and a corresponding data array, e.g., data array 308. In one embodiment of the present disclosure, the cache controller (e.g. controller 340) comprises a cache slice control module (e.g., module 304) and a compression/decompression module (e.g. module 306).

The compression/decompression module 306 is responsible for compressing the data received from a CPU core into the corresponding cache slice 344 (for transferring to main memory), as well as decompressing the data that is received from the main memory 312 using the memory controller 310 into the corresponding cache slice 344.

When a CPU core 302, for example, needs to decompress and load an activation map from the memory into a cache slice, a write cache instruction 330 (accompanied with the base cache address, the base memory address and the data size of the unit of data to be written) is initiated. A read request 380 is transmitted to the memory controller 310 in response to which a compressed feature map may be retrieved from main memory 312 and subsequently decompressed using module 306. Thereafter, the decompressed data is written into data arrays 308. Note that the base memory address (and, typically, the data size) transmitted along with write instruction 330 are used to retrieve the feature map from memory 312. The cache address specified in the write instruction 330 determines the recipient cache slice 344 for the retrieved feature map.

As noted previously, a data transfer takes place from the memory 312 to the cache slice 344 before each convolution operation, wherein input feature maps are loaded from the memory to the cache. The maps being transferred from the main memory to the cache data arrays need to be decompressed by compression/decompression module 306 prior to the transfer to the data arrays 308.

Referring to FIG. 3 again, the core 302 first initializes the data transfer by issuing the specialized instruction for decompression (details of modifications to the instruction set architecture of the processor to accommodate specialized instructions associated with the compression/decompression module 306 will be discussed below). In the multi-core CPU, the instruction is then transferred to the cache controller 340 (within cache slice 344) in the cache slice corresponding to the destination cache address. For each chunk, the cache controller 340 first sends a request to memory 312 (using memory controller 310) for the data at the starting address. The starting address for different chunks are calculated based on the starting address of the bulk (which, for example, may be provided with the write instruction 330), the chunk index, and the constant chunk size (which, as explained above, may be programmable). A counter (not shown) is maintained for increasing the chunk index until it reaches the total number of chunks in the bulk.

Figure 4:
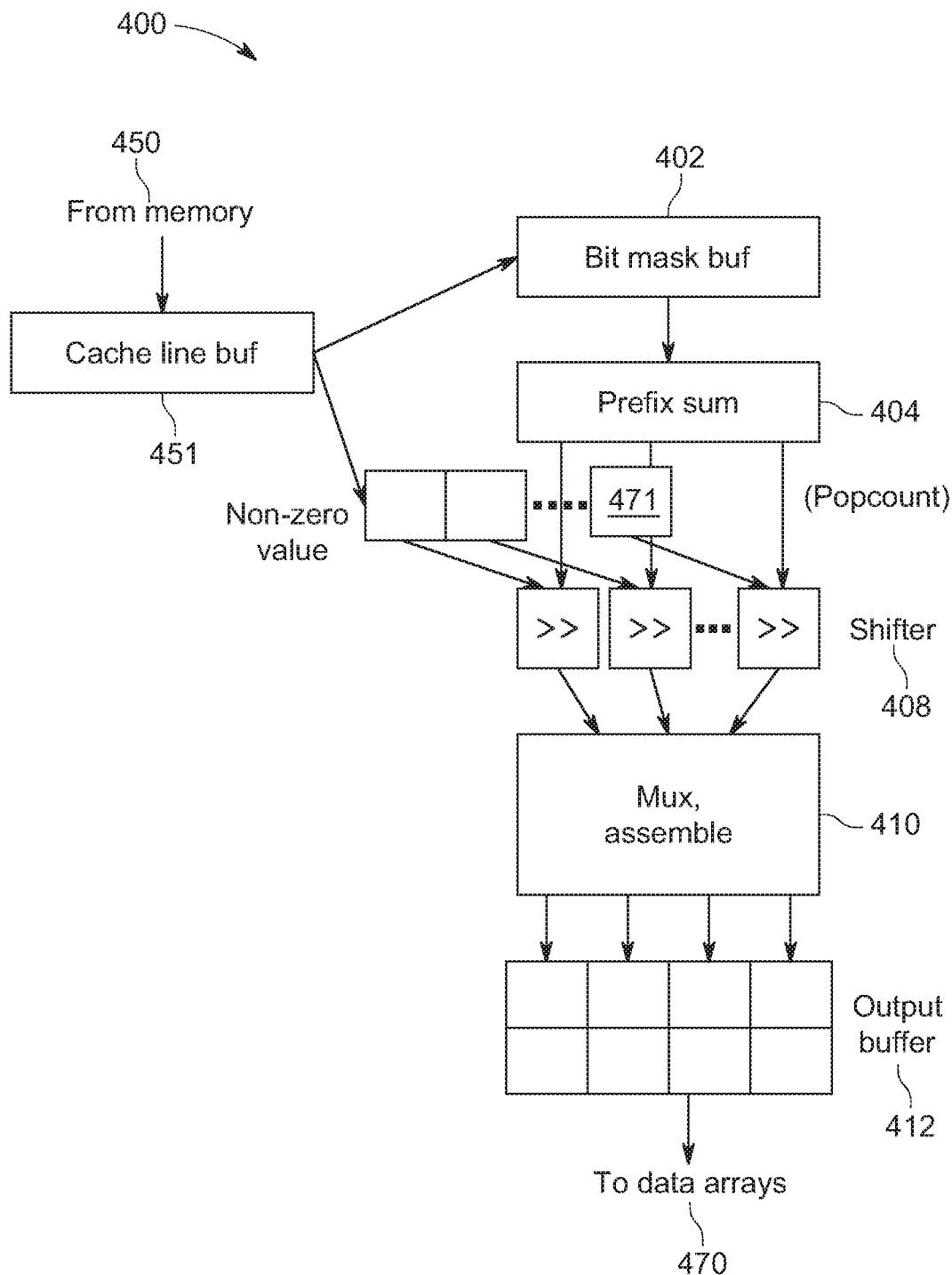
FIG. 4 is a block diagram illustrating the architecture of the decompression module in accordance with an embodiment of the present disclosure.

FIG. 4 is a block diagram illustrating the architecture of the decompression module 400 in accordance with an embodiment of the present disclosure.

In response to the specialized instruction for decompression, a bit mask for a given chunk is returned from the memory 450 to the cache controller 340 and stored in cache line buffer 451 (which is a buffer within the cache controller 340 that is independent of the compression/decompression module 400).

As noted above, in one embodiment, a bit-mask may be the same size as a single cache line (e.g., 64 bytes, which would correspond to a chunk length of 512 bytes). Subsequently, a bit-count of the bit mask vector generates the length of the data chunk after compression. In an embodiment, a prefix sum circuit 404 may be used to perform the bit-count. For example, if '0's in a bit-mask correspond to non-zero values in a corresponding chunk, a count of all the '0's in the bit-mask will yield the length of the corresponding chunk post-compression. Stated differently, the bit-mask vector can be used to determine the number of non-zero elements that a particular chunk condensed down to as a result of the compression operation. Determining the number of non-zero values will allow the cache slice controller (e.g. controller 340) to determine how many cache lines of non-zero values are associated with the corresponding chunk. As discussed above, there may be more than 64 bytes (a single cache-line) of non-zero values in a given chunk, in which case multiple cache lines of compressed data may need to be accessed from the memory to decompress a single chunk. For example, if there are 127 bytes of non-zero values, two separate requests or accesses to the memory may need to be made, where each access returns a single cache line of data.

Subsequently, the cache controller 340 initializes memory read requests for the compressed data from memory 450 based on the starting address of a respective chunk, and the calculated data size after compression.

In one embodiment, when the required data is fetched by memory 450 and sent back to CPU via the memory channel, the data is handled by the on-chip memory controller (not shown) similar to a normal memory read transaction. Then the memory controller sends the data to the requested cache slice (e.g., cache slice 344 in FIG. 3) according to the associated memory address via the mesh interconnect.

The decompression module 400 inside the cache controller (e.g. module 340 in FIG. 3) initiates the decompression operation at the arrival of the compressed data. A special control signal within the cache controller distinguishes the compressed data from normal uncompressed data.

In one embodiment, during decompression, the data is also processed in chunks. The chunk length (CL) is the size of the decompressed data in each chunk. As noted above, in one embodiment, the CL may be 512 bytes.

In the process of decompressing one chunk, first the bit mask (e.g., 64 bytes or one cache line of bit mask data) for an associated chunk is loaded into the bit mask buffer 402 within the decompression module 400. The cache controller initializes the output buffer 412 (which temporarily stores the data to be transmitted to the data arrays within the associated cache slice) inside decompression module 400 with zeros.

In one embodiment, the prefix sum is generated by the prefix sum module 404 according to the bit mask, one value per bit. Subsequently, a single cache line block (e.g., 64 bytes) of non-zero compressed values are loaded into the cache line buffer 451. (For example, for a bfloat16 type of data format, 32 non-zero values may be loaded where each value comprises 2 bytes). After the non-zero values are loaded into cache line buffer 451, they may be transferred to an internal buffer or register 471 within decompression module 400 where they are shifted by shifter 408 according to their corresponding offset value generated by the prefix sum. In other words, using the bit mask and the prefix sum, shifter 408 and the multiplexer and assembler module 410, add the zeros back into the compressed data to re-create the original uncompressed data chunk.

Note that in the event there is more than one cache line worth of non-zero values (e.g., more than 64 bytes), the decompressing process is repeated again for the remaining cache lines.

Subsequent to shifting, the data is selectively copied to the output buffer 412 based on its corresponding bit mask, thereby forming the decompressed data for the chunk, together with the zero values. The output buffer size is selected taking into consideration the data sparsity.

In one embodiment, as applied to CNN training, the sparsity rate of a target feature map array is usually 25-75%, so the optimal size of the output buffer is selected to be 256 bytes. The contents of the output buffer are then transmitted to the data arrays 470 of a corresponding cache slice via the intra-slice data bus.

In an embodiment, if the total size of the decompressed data for the non-zero values (e.g., the 32 non-zero values noted above) exceeds the output buffer size, the data may be decompressed sequentially.

Figure 6:
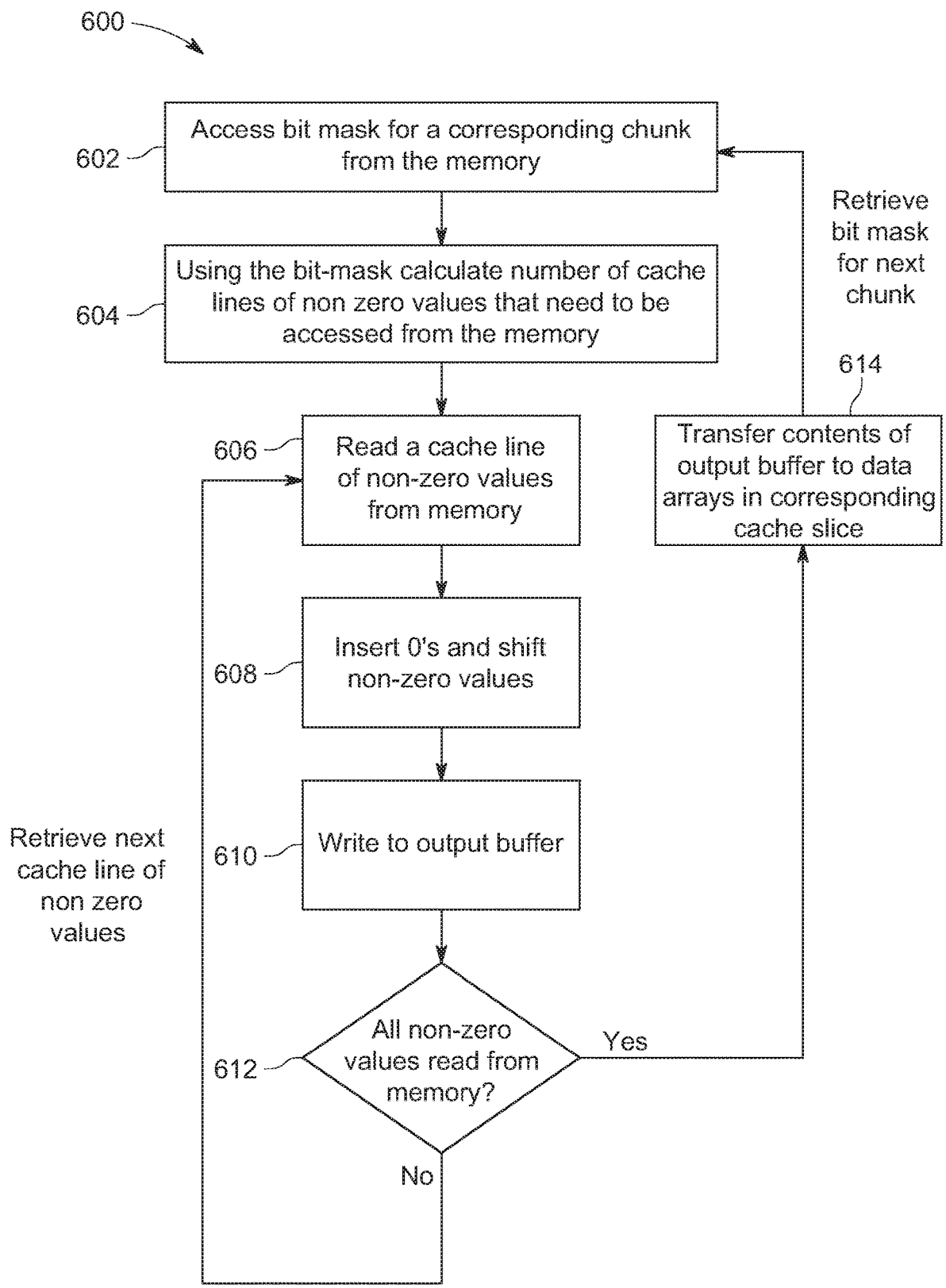
FIG. 6 depicts a flowchart illustrating an exemplary computer-implemented process for decompressing data in a cache slice of a multi-core processor prior to transferring the data from main memory to the cache in accordance with an embodiment of the present disclosure.

FIG. 6 depicts a flowchart illustrating an exemplary computer-implemented process 600 for decompressing data in a cache slice of a multi-core processor prior to transferring the data from main memory to the cache in accordance with an embodiment of the present disclosure.

At step 602, a bit mask for a corresponding chunk to be decompressed is accessed from main memory into a decompression module, e.g., module 306. Note that this access may be in response to a specialized decompression instruction issued by the multi-core processor.

At step 604, the bit mask is used to calculate the number of cache lines of non-zero values that need to be accessed from the memory. This determines the number of accesses to main memory that will be required to decompress the corresponding chunk of data.

At step 606 a cache line worth of non-zero values are read from the memory at the address specified in the associated instruction.

At step 608, as noted above, after the non-zero values are loaded into the cache line buffer, they are shifted by the shifter according to their corresponding offset value generated by the prefix sum. In other words, using the bit mask, the '0's are added back into the compressed data (comprising non-zero values) at the appropriate location.

At step 610, the uncompressed data is written to the output buffer.

At step 612, a determination is made whether all non-zero values are read from memory. As noted above, there may be more than a single cache line worth of non-zero values corresponding to the chunk being decompressed. If there are additional non-zero values, the process is repeated starting at step 606.

If a determination is made that there are no more non-zero values for the chunk being decompressed, then, at step 614, the contents of the output buffer in the decompression module are transferred to the data array of an associated cache slice (that corresponds to the cache address specified in the decompression instruction).

Instruction Set Architecture Extension

In one embodiment, specialized instructions may need to be programmed into a multi-core processor that can be used to initialize compression and decompression processes.

For an exemplary compression instruction, the fields may comprise: (1) starting address of cache in scratchpad mode (as a source address): (2) starting address of memory (as a destination address); and (3) number of chunks in the transfer. Upon the decoding of this compression instruction, the cache controller prepares for the reading of the required data, and the required memory address space is allocated and pinned within the page table.

For decompression, the specialized instruction may comprise the fields of: (1) starting address of memory (as a source address): (2) starting address of cache in scratch mode (as a destination address); and (3) number of chunks in the transfer. Upon the decoding of the decompression instruction, the cache controller prepares for the writing of the data with the specified size; the memory controller starts fetching data from the specified starting address, and the burst length is determined by the bit mask in the initial address.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

What is claimed is:

1. A system for facilitating machine learning utilizing a multi-core processor, the system comprising:
   a processor comprising a plurality of processor cores; and
   a plurality of cache slices, wherein each processor core of the plurality of processor cores is configured to access each of the plurality of cache slices, and
   wherein each cache slice comprises:
      a data array operable to store decompressed data; and
      a cache controller configured to:
         retrieve a chunk of data from the data array, wherein the chunk of data is comprised within an activation map of a neural network, and wherein the activation map comprises intermediate results computed by a stage of the neural network; and
         compress the chunk of data, wherein the chunk of data comprises elements, and wherein, in order to compress the chunk of data, the cache controller is further configured to:
         calculate a bit mask for the chunk of data;
         using the calculated bit mask and a prefix sum as inputs, generate a linear shift offset associated with the chunk of data, wherein the prefix sum is generated by a prefix sum module based on the bit mask generating one value per bit;
         using the linear shift offset, shift out the elements linearly in the chunk of data corresponding to zero values, wherein non-zero value elements in the chunk of data are retained; and
         write the bit mask and the non-zero value elements of the chunk of data to a memory, wherein to perform the write of the non-zero value elements, the memory is accessed each time a cache line is filled with the non-zero value elements following a convolution operation of the neural network, and wherein the memory is accessed to write the non-zero value elements a single cache line at a time until the chunk of data is fully compressed.

2. The system of claim 1, wherein the elements in the chunk of data comprise bytes of data, wherein a length of the chunk of data is fixed, and wherein the length of the chunk of data is programmable.

3. The system of claim 1, wherein to calculate the bit mask, the cache controller is further configured to compare each element in the chunk of data with zero, and wherein each bit in the bit mask is operable to indicate whether a corresponding element in the chunk of data comprises zero-values.

4. The system of claim 1, wherein the non-zero value elements are written to the memory in a separate write operation than the bit mask.

5. A system for performing data decompression in a cache controller of a multi-core processor, the system comprising:
   a processor comprising a plurality of processor cores; and
   a cache associated with the processor, wherein the cache is distributed between a plurality of cache slices, wherein each processor core of the plurality of processor cores is operable to access each of the plurality of cache slices, and
   wherein each cache slice comprises:
      a data array operable to store decompressed data; and
      a cache controller configured to:
         retrieve a bit mask corresponding to a compressed chunk of data from a memory associated with the processor, wherein the compressed chunk of data is associated with an activation map of a neural network, wherein the activation map comprises intermediate results computed by a stage of the neural network, and wherein the bit mask is retrieved prior to a convolution operation of the neural network;
         using the retrieved bit mask and a prefix sum as inputs, generate a linear shift offset associated with the compressed chunk of data, wherein the prefix sum is generated by a prefix sum module based on the bit mask generating one value per bit;
         retrieve non-zero value elements corresponding to the compressed chunk of data from the memory, wherein the non-zero value elements are retrieved from the memory a single cache line at a time;
         using the bit mask and the linear shift offset, decompress the compressed chunk of data by shifting the non-zero value elements linearly to insert zero value elements at locations indicated by the bit mask, and wherein the non-zero value elements are retrieved from the memory a single cache line at a time until the compressed chunk of data is fully decompressed; and
         write the decompressed chunk of data to the data array.

6. The system of claim 5, wherein the non-zero value elements comprise bytes of non-zero value data and the zero value elements comprise bytes of zero value data.

7. The system of claim 5, wherein prior to retrieving the non-zero value elements, the cache controller is further configured to use the bit mask to calculate a number of cache lines of non-zero value elements to be retrieved from the memory.

8. The system of claim 5, wherein each bit in the bit mask is operable to indicate whether a corresponding element in the decompressed chunk of data comprises zero-values.

9. A method for performing data compression in a multi-core processor, the method comprising:

retrieving a chunk of data from a data array of a cache slice, wherein the cache slice is comprised within a cache associated with the multi-core processor, wherein the cache is distributed between a plurality of cache slices, wherein each core of the multi-core processor can access each of the plurality of cache slices, and wherein the chunk of data is comprised within an activation map of a neural network, and wherein the activation map comprises intermediate results computed by a stage of the neural network;

calculating a bit mask for the chunk of data, wherein the chunk of data comprises elements;

using the calculated bit mask and a prefix sum as inputs, generating a linear shift offset associated with the chunk of data, wherein the prefix sum is generated by a prefix sum module based on the bit mask generating one value per bit;

using the linear shift offset, shifting out the elements linearly in the chunk of data corresponding to zero values, wherein non-zero value elements in the chunk of data are retained; and writing the bit mask and the non-zero value elements to a memory, wherein the writing comprises accessing the memory following a convolution operation of the neural network to write a single cache line of the non-zero value elements for each access, and wherein the memory is accessed to write the non-zero value elements a single cache line at a time until the chunk of data is fully compressed.

10. The method of claim 9, wherein the elements in the chunk of data comprise bytes of data.

11. The method of claim 9, wherein a length of the chunk of data is fixed, and wherein the length is programmable.

12. The method of claim 9, wherein the calculating the bit mask comprises:

comparing each element in the chunk of data with zero, and wherein each bit in the bit mask is operable to indicate whether a corresponding element in the chunk of data comprises zero-values.

13. The method of claim 9, wherein the non-zero value elements are written to the memory in a separate write operation than the bit mask.

* * * * *